UNITED STATES PATENT OFFICE.

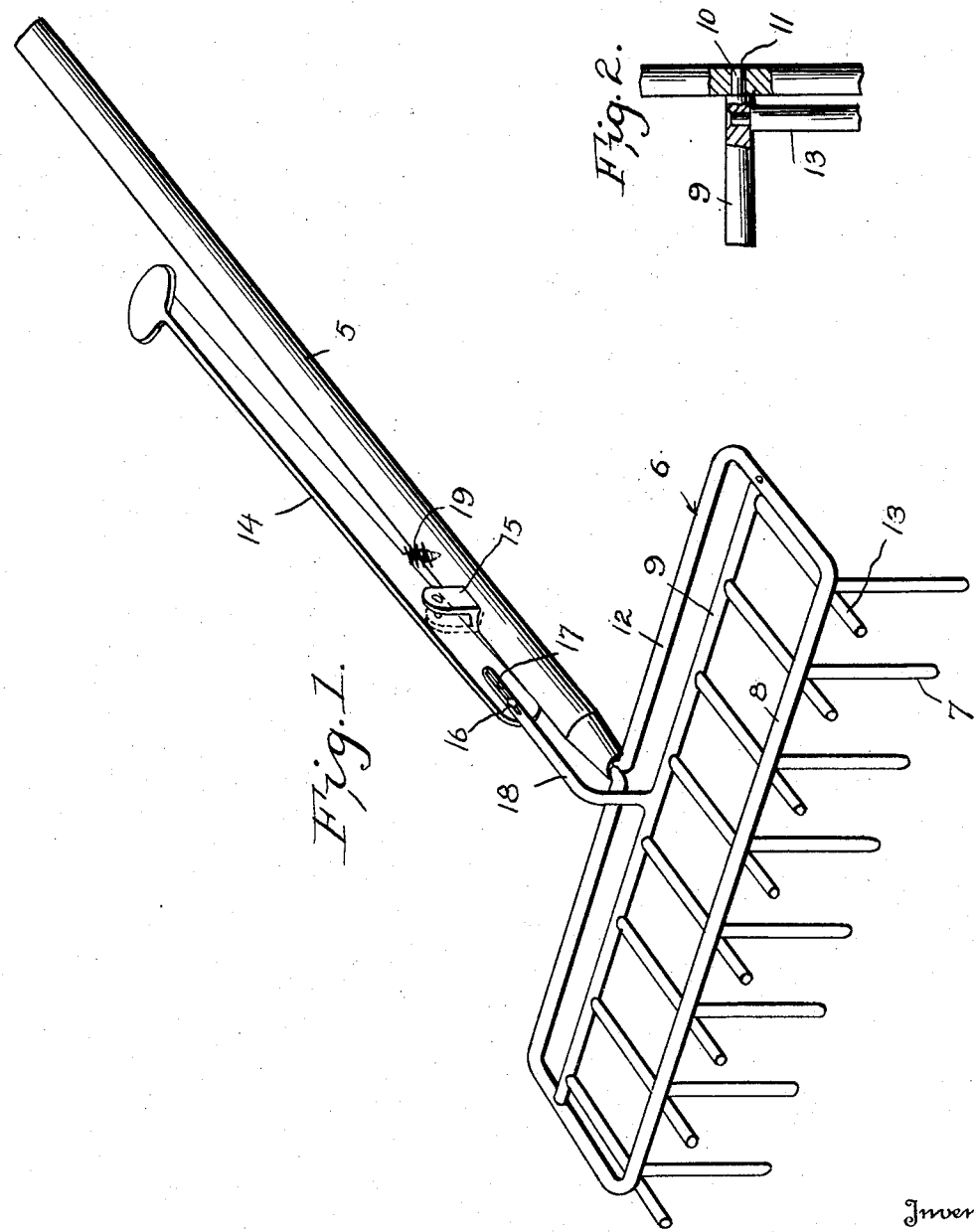

EDMON W. KELLER, OF CRIPPLE CREEK, COLORADO.

RAKE.

1,097,028.  Specification of Letters Patent. Patented May 19, 1914.

Application filed January 20, 1914. Serial No. 813,244.

*To all whom it may concern:*

Be it known that I, EDMON W. KELLER, a citizen of the United States, residing at Cripple Creek, in the county of Teller and State of Colorado, have invented certain new and useful Improvements in Rakes; and I do hereby declare the following to be a full, clear, and exact description of the invention, such as will enable others skilled in the art to which it appertains to make and use the same.

The primary object of this invention is to provide a simple, inexpensive and practical rake having a novel cleaning means secured thereto.

Another and more specific object of the invention is to provide a garden rake having a rectangular frame head, to the outer bar of which are secured the teeth and between the end bars of which is journaled a shaft carrying stripper arms which may be swung downwardly along the teeth when the shaft is rotated.

With these and other objects in view as will become more apparent as the description proceeds, the invention consists in certain novel features of construction, combination and arrangement of parts as will be hereinafter more fully described and claimed.

For a complete understanding of my invention, reference is to be had to the following description and accompanying drawings, in which—

Figure 1 is a perspective view of my improved cleaning rake, and Fig. 2 is a detail fragmentary view partly in section, showing the way in which the shaft is connected to the frame head and the arms are connected to the shaft.

Referring in detail to the drawings by numerals, 5 designates the handle of the rake to the outer end of which is secured a rectangular frame 6, having a plurality of teeth 7 projecting downwardly at right angles to the outer head bar 8. A shaft 9 is journaled within the rectangular head parallel to the front and rear bars thereof by having its terminals reduced, as indicated by the numeral 10, to form trunnions which are inserted within openings 11 formed in the end bars of the head. The shaft 9 is arranged relatively close to the inner longitudinal bar 12 of the head, and carries a plurality of stripper arms 13, which extend forwardly at right angles to the shaft under the bar 8 and in engagement with the teeth 7. These stripper arms project somewhat beyond the teeth so that when the shaft 9 is rotated, they will swing downwardly and scrape the teeth for the full length thereof. An operating lever 14 is pivoted intermediate its ends between the ears of a bracket 15 mounted on the handle 5 and carries adjacent its outer end a pin 16 which extends through a longitudinal slot 17 formed in an angular arm 18 connected to the shaft 9. This arm extends upwardly from the shaft 9 and then inwardly in the direction of the handle 5 above the same, and when its inner end is swung upwardly, the shaft 9 will turn to carry the stripper arm downwardly along the teeth 7'. An expansive spiral spring 19 is interposed between the inner portion of the lever 14 and the rake handle 15 so as to force the outer end of the lever toward the rake handle, whereby the stripper arms 13 are held normally in engagement with the head bar 8.

From the foregoing description taken in connection with the accompanying drawings, it will be apparent that I have provided a very simple and practical cleaning rake, the teeth of which may be easily kept clean and free from leaves, dirt and other accumulations.

While I have shown and described the preferred embodiment of my invention, it will be understood that minor changes in construction, combination and arrangement of parts may be made without departing from the spirit and scope of the invention as claimed.

Having thus described my invention, I claim:—

A rake comprising a handle, a rectangular frame secured to the outer end of said handle, a plurality of teeth secured to the outer bar of the frame and extending at right angles to the plane thereof, a shaft having trunnions formed on the ends thereof, the end bars of the frame being formed with openings to receive said trunnions and hold the shaft parallel to the outer frame bar, a plurality of stripper arms secured to said shaft and projecting outwardly into engagement with and past the teeth, a lever pivoted intermediate its ends on the handle, an arm secured to the shaft and extending inwardly toward the lever, and a pin and slot connection between said lever and arm.

In testimony whereof I affix my signature in presence of two witnesses.

EDMON W. KELLER.

Witnesses:
H. C. BAKER,
MARY A. KELLER.

Copies of this patent may be obtained for five cents each, by addressing the "Commissioner of Patents, Washington, D. C."